(12) United States Patent
Smith et al.

(10) Patent No.: US 10,963,217 B2
(45) Date of Patent: Mar. 30, 2021

(54) COMMAND DETECTION NOTIFICATION ON AUXILIARY DISPLAY

(71) Applicant: Lenovo (Singapore) Pte. Ltd., Singapore (SG)

(72) Inventors: Madison Kay Smith, Manhattan Beach, CA (US); Cuong Huy Truong, Cary, NC (US); Brian Hargrove Leonard, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 73 days.

(21) Appl. No.: 16/389,978

(22) Filed: Apr. 21, 2019

(65) Prior Publication Data

US 2020/0334007 A1 Oct. 22, 2020

(51) Int. Cl.
| | |
|---|---|
| *G06F 3/16* | (2006.01) |
| *G10L 25/78* | (2013.01) |
| *G10L 21/14* | (2013.01) |
| *G10L 15/26* | (2006.01) |
| *G10L 17/00* | (2013.01) |

(52) U.S. Cl.
CPC .............. *G06F 3/167* (2013.01); *G10L 15/26* (2013.01); *G10L 17/00* (2013.01); *G10L 21/14* (2013.01); *G10L 25/78* (2013.01)

(58) Field of Classification Search
CPC ......... G10L 15/26; G10L 17/00; G10L 21/14; G10L 25/78; G10L 1/16
See application file for complete search history.

(56) References Cited

U.S. PATENT DOCUMENTS

| 9,830,075 B2* | 11/2017 | Kim | G06F 3/04845 |
| 10,627,979 B2* | 4/2020 | Su | G06F 3/167 |
| 2010/0105435 A1* | 4/2010 | Ueda | H04M 1/0245 |
| | | | 455/563 |
| 2015/0280770 A1* | 10/2015 | Rhee | H04B 10/116 |
| | | | 455/575.8 |

* cited by examiner

*Primary Examiner* — Sonia L Gay
(74) *Attorney, Agent, or Firm* — Ference & Associates LLC (57) ABSTRACT

One embodiment provides a method, including: detecting, at an information handling device, voice command input; determining, using a processor, an orientation state of the information handling device, wherein the orientation state is one of: a closed state or an open state; and displaying, responsive to determining that the orientation state is associated with the closed state and on an auxiliary display of the information handling device, a notification acknowledging receipt of the voice command input. Other aspects are described and claimed.

20 Claims, 5 Drawing Sheets

COMMAND DETECTION NOTIFICATION ON AUXILIARY DISPLAY

BACKGROUND

Information handling devices ("devices), for example laptop computers, hybrid devices, other clamshell or foldable devices, and the like, may be capable of receiving voice command input from a user, processing the input, and thereafter performing a function based on the input. A user may be apprised of the recognition of their command input by the inherent performance of the desired function and/or by a visual notification generally displayed on a primary displace of a device.

BRIEF SUMMARY

In summary, one aspect provides a method, comprising: detecting, at an information handling device, voice command input; determining, using a processor, an orientation state of the information handling device, wherein the orientation state is one of: a closed state or an open state; and displaying, responsive to determining that the orientation state is associated with the closed state and on an auxiliary display of the information handling device, a notification acknowledging receipt of the voice command input.

Another aspect provides an information handling device, comprising: a processor; a memory device that stores instructions executable by the processor to: detect voice command input; determine an orientation state of the information handling device, wherein the orientation state is one of: a closed state or an open state; and display, responsive to determining that the orientation state is associated with the closed state and on an auxiliary display of the information handling device, a notification acknowledging receipt of the voice command input.

A further aspect provides a product, comprising: a storage device that stores code, the code being executable by a processor and comprising: code that detects voice command input; code that determines an orientation state of the information handling device, wherein the orientation state is one of: a closed state or an open state; and code that displays, responsive to determining that the orientation state is associated with the closed state and on an auxiliary display of the information handling device, a notification acknowledging receipt of the voice command input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 5(A-B) illustrates an example embodiment of a dynamically movable integrated device cover.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently communicate with their devices using voice input. More particularly, a user may provide voice input commands to an intelligent digital assistant resident on the device's system. Responsive to detecting the command, the digital assistant may process the command and thereafter instruct the device to perform a corresponding function. Common examples of voice input commands include application activation commands, note recording commands, information query commands, and the like.

Conventionally, digital assistants may either be always-on (i.e., active and capable of receiving and processing voice input commands even when other functions of the device are deactivated) or, alternatively, may only be activate when certain requirements are met (e.g., a device power level is above a predetermined threshold, a primary display of a device is active, etc.). In situations where a device is in a closed state (e.g., when a laptop cover is folded down against the base of the laptop, etc.), it may be difficult for a user to ascertain whether the digital assistant on the device is active and/or listening for voice input commands. If a user provides command input to an inactive device, they may become frustrated that their command input was not processed.

Accordingly, an embodiment provides a method for outputting a notification that acknowledges detection of a voice command input when a device is in a closed state. In an embodiment, a voice input command input may be detected. An embodiment may then determine whether the device is an open state or a closed state and, responsive to determining that the device is in the closed state, an embodiment may display a notification acknowledging receipt/detection of the voice command input. In an embodiment, the notification may be displayed on an auxiliary display of the device (e.g., positioned on a portion of the device's A-cover, etc.). Such a method may inform a user whether or not their voice inputs are being detected and processed when their device is in a closed state.

The illustrated example embodiments will be best understood by reference to the figures. The following description is intended only by way of example, and simply illustrates certain example embodiments.

Figure 1:
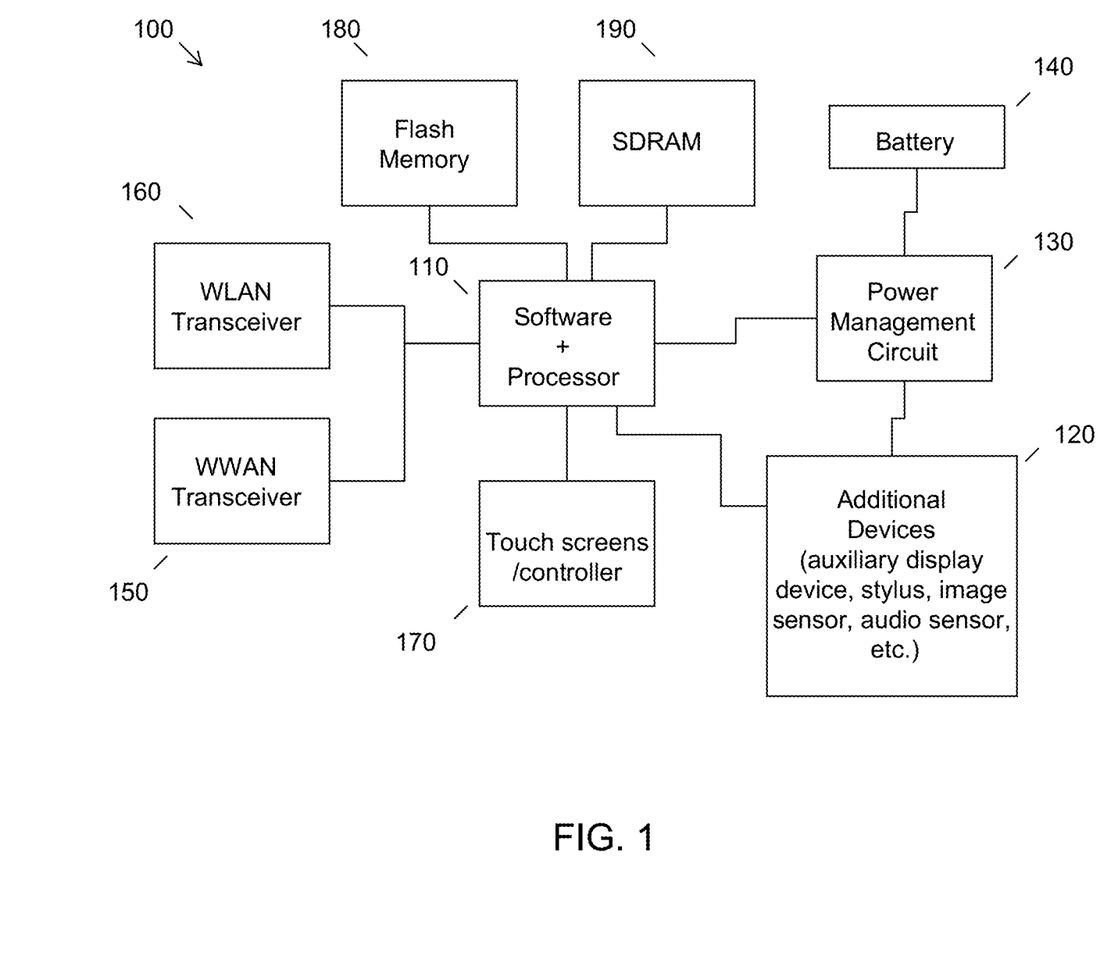
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an auxiliary display, an input device such as a stylus, image sensor such as a camera, audio capture device such as a microphone, external keyboard, other input devices, etc. System 100 often includes one or more touch screens 170 for data input and display/rendering. System 100 also typically includes various memory devices, for example flash memory 180 and SDRAM 190.

Figure 2:
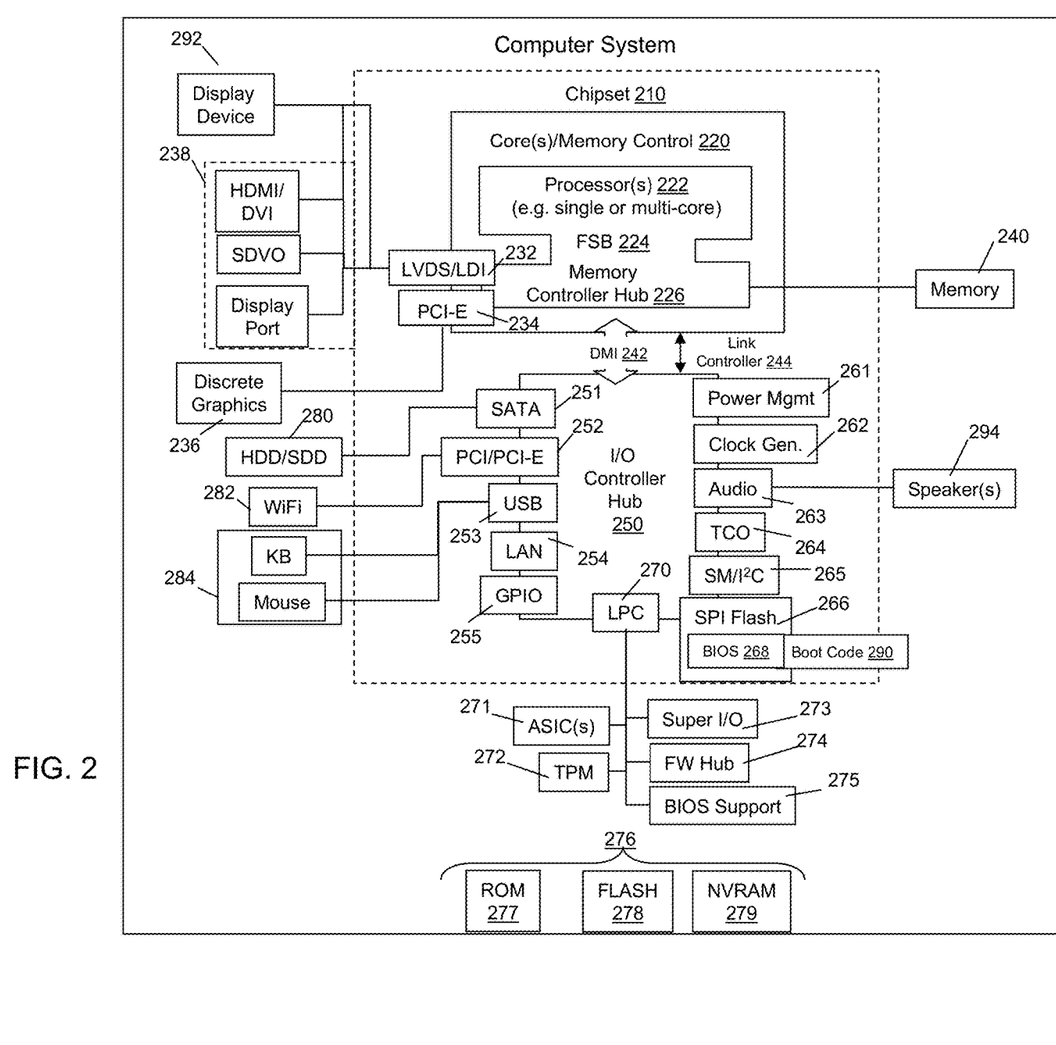
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD and/or YOGA series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as laptops, hybrid devices, other foldable devices, and/or other electronic devices that may comprise an auxiliary display on an outer cover of the device. For example, the circuitry outlined in FIG. 1 may be implemented in a hybrid tablet device, whereas the circuitry outlined in FIG. 2 may be implemented in a laptop.

Figure 3:
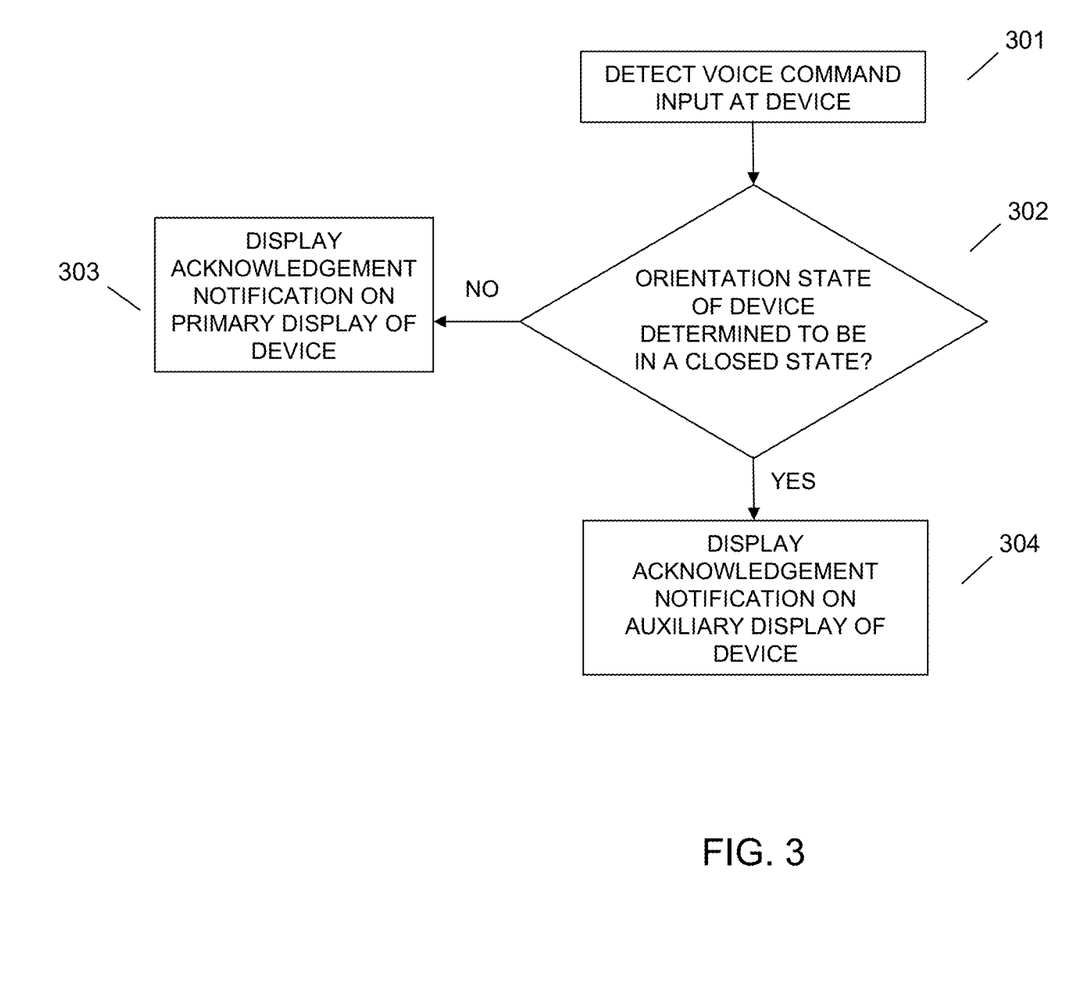
FIG. 3 illustrates an example method of providing an acknowledgement notification to a user when a device is in a closed state.

Referring now to FIG. 3, an embodiment may display an acknowledgement notification of a user command input on an auxiliary display of a device. At 301, an embodiment may detect a user input command. For simplicity purposes, the remainder of the disclosure will be described with reference to a voice input command. However, it is important to note that this designation is not limiting and that other input commands may also be provided to and detected by the device (e.g., a device may detect a gesture input command using one or more camera sensors, etc.). In an embodiment, the voice input command may be detected by one or more audio capture devices (e.g., microphones, etc.) integrally or operatively coupled to the device.

At 302, an embodiment may determine whether the orientation state of the device is associated with a closed state or an open state. In the context of this application, a device in a closed state may refer to a device that is folded so that a primary display portion of the device is situated substantially parallel with respect to a base portion of the device. Conversely, in the context of this application, a device in an open state may refer to a device where an angle between the primary display portion and the base portion exceeds a predetermined threshold angle (e.g., 45 degrees, 90 degrees, 120 degrees, etc.). In an embodiment, the determination may be facilitated by using one or more sensors integrally or operatively coupled to the device (e.g., camera sensors, gyroscopes, etc.).

Responsive to determining, at 302, that the orientation state of a device is associated with an open state, an embodiment may, at 303, provide an acknowledgement notification to a user on a primary display of the device. Conversely, responsive to determining, at 302, that the orientation state of the device is associated with a closed state, an embodiment may, at 304, provide an acknowledgement notification to a user on an auxiliary display of the device.

Figure 4:
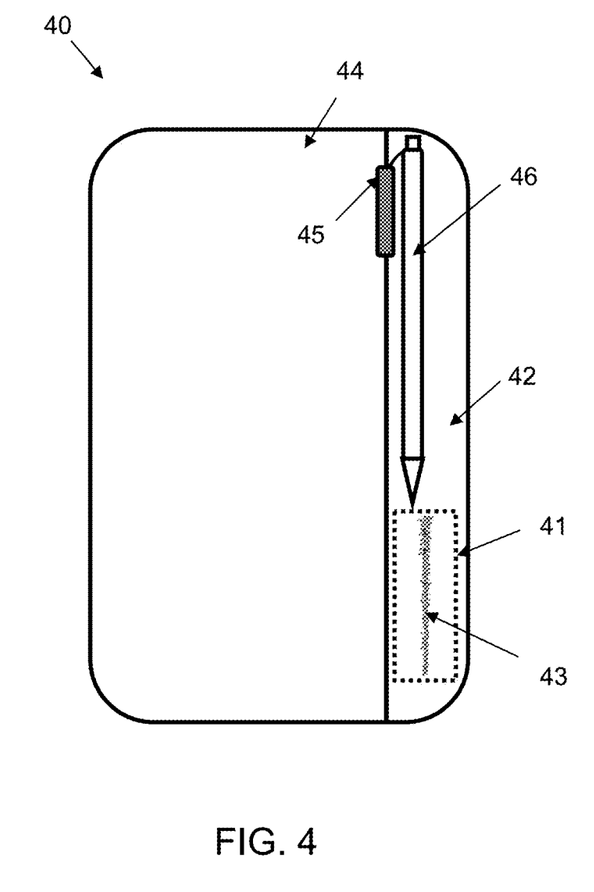
FIG. 4 illustrates an example embodiment of a device comprising an auxiliary display.

Referring now to FIG. 4, an example embodiment of a top view of a device 40 in a closed state comprising an auxiliary display 41 is provided. In this illustration, the auxiliary display 41 is positioned at a corner of an A-cover 42 of the device 40. The auxiliary display 41 may comprise a glass panel with one or more light emitting diodes (LEDs) (not illustrated) mounted behind the glass panel. The LEDs may be utilized to provide a visual notification 43 to a user, as further described later in this application. The device may also comprise a dynamically movable integrated cover 44 (aspects of which are described below) having an integrated stylus holder 44 configured to support storage of a stylus 46. It is important to note that the positioning and size of the auxiliary display 41 is not limiting and other configurations may have a larger or smaller auxiliary display positioned on another portion of the A-cover 42 of the device.

Figure 5A:
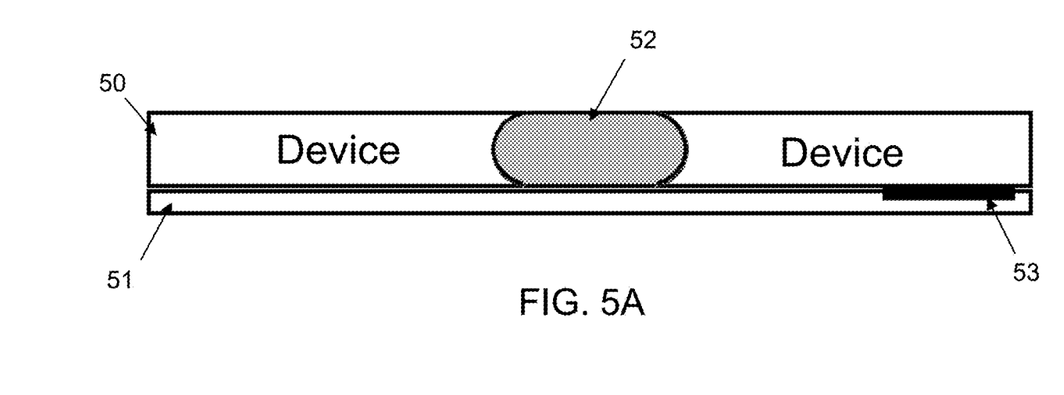
Figure 5B:
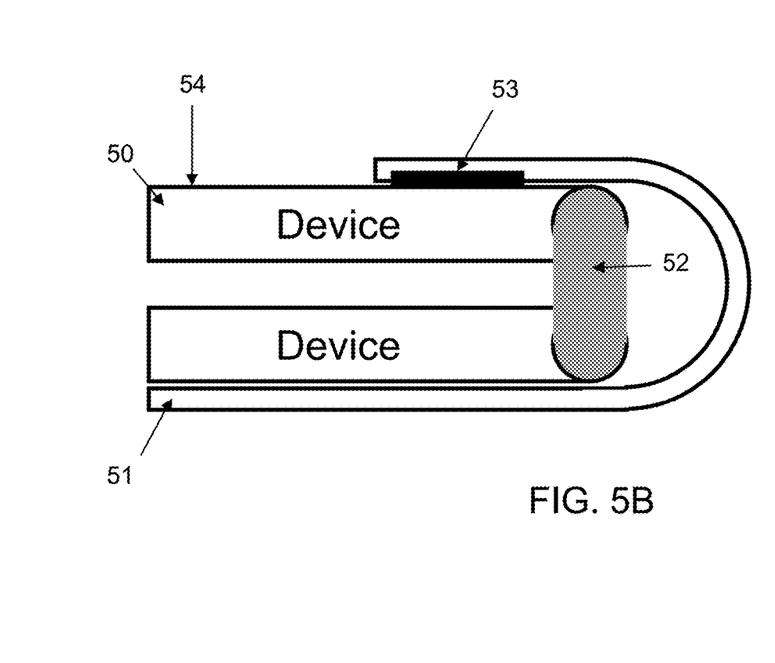

Referring now to FIG. 5(A-B), an example embodiment of a dynamically movable integrated cover is provided. In FIG. 5A, a device 50 in a completely open state (i.e., 180 degrees between the base portion and the primary display portion) is illustrated. In this orientation, the integrated cover 51 spans the length of the device 50, thereby effectively covering all of the back portions of the device 50. The device 50 may also comprise a hinge joint 52 that facilitates bending/folding of the device. When the device 50 is folded to a closed state, as illustrated in FIG. 5B, a slide mechanism 53 embedded inside of the integrated cover 51 may work to slide a portion of an end of the integrated cover 51 down towards the hinge joint 52. This movement of the integrated cover 51 may reveal an auxiliary display 54 positioned on an A-cover of the device 50.

In an embodiment, the acknowledgement notification may be of a particular type. For example, the acknowledgement notification may be a textual notification (e.g., with a confirmation phrase such as "listening", etc.), an image notification (e.g., a graphic indicating that the voice input command is being detected, etc.), an animation notification (e.g., a moving soundwave pattern as illustrated at 43 in FIG. 4, etc.), a stagnant or blinking light, and the like. In an embodiment, the type of acknowledgement notification used may not only be based on the display parameters of the auxiliary display, but may also be based on one or more predetermined user settings. For instance, in an embodiment the selection of the notification type may be based on the identification of the input-providing user. For example, User A may desire to see text-based acknowledgement notifications whereas User B may desire to see animation-based acknowledgement notifications. Additionally or alternatively, in another embodiment, the notification type may be predicated on one or more other factors such as: the type of input command being provided (query input command vs. note-taking command, etc.), a user's contextual environment (e.g., a brighter notification type in bright environments vs. a dimmer notification type in dark environments, etc.), and the like.

In an embodiment, the acknowledgement notification may only be displayed during a time period when the user is providing the input command to the device. In this embodiment, when the user finishes providing the input command, the acknowledgement notification may be removed from the auxiliary display. Alternatively, in another embodiment, the acknowledgement notification may remain displayed on the auxiliary display for a predetermined amount of time after the input command was provided (e.g., 3 seconds, 5 seconds, etc.).

In an embodiment, a confirmation notification, different from the acknowledgement notification, may be provided on the auxiliary display when a function associated with the command input is executed by the system. This confirmation notification may be provided using any of the notification types described above. Similarly, in another embodiment, a rejection notification may be provided on the auxiliary display when a function associated with the command input was unable to be executed by the system. In this embodiment, the rejection notification may comprise an explanation (e.g., in the form of a graphic, text, animation, a combination thereof, etc.) regarding why the function associated with the command input could not be executed by the system of the device.

The various embodiments described herein thus represent a technical improvement to conventional methods for informing a user that their command input has been received and/or detected. Using the techniques described herein, an embodiment may detect command input provided by a user (e.g., voice command input, etc.). An embodiment may then determine whether an orientation state of a device is associated with a closed state or an open state. Responsive to determining that the orientation state of the device is associated with the closed state, an embodiment may display a notification acknowledging receipt of the command input on an auxiliary display of the device. Such a method may allow a user to be apprised of whether or not any command input provided by the user was being registered by the device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, at an information handling device, voice command input;
    determining, using a processor, an orientation state of the information handling device, wherein the orientation state is one of: a closed state or an open state;
    identifying an identity of a user providing the voice command input; and
    displaying, responsive to determining that the orientation state is associated with the closed state and on an auxiliary display of the information handling device, a notification acknowledging receipt of the voice command input, wherein a presentation type of the notification is based upon the identity of the user.

2. The method of claim 1, wherein a primary display of the information handling device in the closed state is covered.

3. The method of claim 1, wherein the auxiliary display is positioned on a portion of an A-cover of the information handling device.

4. The method of claim 1, wherein the auxiliary display is obscured by an integrated cover when the information handling device is in the open state.

5. The method of claim 4, wherein the integrated cover moves to reveal the auxiliary display when the information handling device is adjusted from the open state to the closed state.

6. The method of claim 1, wherein the notification is of a type selected from the group consisting of a textual notification, an image notification, an animation notification, and a blinking notification.

7. The method of claim 6, wherein the type is based on predetermined user settings.

8. The method of claim 1, wherein the displaying comprises displaying the notification during a time period when the voice command input is being detected.

9. The method of claim 1, further comprising providing a confirmation notification on the auxiliary display responsive to completing a function corresponding to the voice command input.

10. The method of claim 1, further comprising providing a rejection notification on the auxiliary display responsive to being unable to complete a function corresponding to the voice command input.

11. An information handling device, comprising:
    a processor;
    a memory device that stores instructions executable by the processor to:
    detect voice command input;
    determine an orientation state of the information handling device, wherein the orientation state is one of: a closed state or an open state;
    identify an identity of a user providing the voice command input; and
    display, responsive to determining that the orientation state is associated with the closed state and on an auxiliary display of the information handling device, a notification acknowledging receipt of the voice command input, wherein a presentation type of the notification is based upon the identity of the user.

12. The information handling device of claim 11, wherein the primary display of the information handling device in the closed state is covered.

13. The information handling device of claim 11, wherein the auxiliary display is positioned on a portion of an A-cover of the information handling device.

14. The information handling device of claim 11, wherein the auxiliary display is obscured by an integrated cover when the information handling device is in the open state.

15. The information handling device of claim 14, wherein the integrated cover moves to reveal the auxiliary display when the information handling device is adjusted from the open state to the closed state.

16. The information handling device of claim 11, wherein the notification is of a type selected from the group consisting of a textual notification, an image notification, an animation notification, and a blinking notification.

17. The information handling device of claim 11, wherein the instructions executable by the processor to display comprise instructions executable by the processor to display the notification during a time period when the voice command input is being detected.

18. The information handling device of claim 11, wherein the instructions are further executable by the processor to provide a confirmation notification on the auxiliary display responsive to completing a function corresponding to the voice command input.

19. The information handling device of claim 11, wherein the instructions are further executable by the processor to provide a rejection notification on the auxiliary display responsive to being unable to complete a function corresponding to the voice command input.

20. A product, comprising:
 a non-transitory storage device that stores code, the code being executable by a processor and comprising:
 code that detects voice command input;
 code that determines an orientation state of the information handling device, wherein the orientation state is one of: a closed state or an open state; and
 code that identifies an identity of a user providing the voice command input; and
 code that displays, responsive to determining that the orientation state is associated with the closed state and on an auxiliary display of the information handling device, a notification acknowledging receipt of the voice command input, wherein a presentation type of the notification is based upon the identity of the user.

* * * * *